Jan. 23, 1973 F. F. RICHARDS, SR 3,712,964

LOCK FOR TELEPHONE INSTRUMENT

Filed July 26, 1971

Fred Richards

INVENTOR 3,712,964
Patented Jan. 23, 1973

3,712,964

LOCK FOR TELEPHONE INSTRUMENT

Fred F. Richards, Sr., P.O. Box 47307,
Dallas, Tex. 75247

Filed July 26, 1971, Ser. No. 154,500
Int. Cl. H04m *1/66*
U.S. Cl. 179—189 R 1 Claim

ABSTRACT OF THE DISCLOSURE

A lock mechanism includes a key-operated lock cylinder contained in a lock body designed to fit into a cradle on a telephone set, a hook-cam attached to the lock cylinder and rotatable with the lock cylinder to engage the telephone case structure in such a manner as to hold the lock body into the telephone cradle where the lock body will hold the switch pins down and keep the telephone electrically inactive.

The present invention relates to a lock for a telephone and more particularly to a lock for a telephone of the removable handset type wherein the hand set, when mounted in the cradle of the telephone, maintains a plunger or the like in a depressed position to maintain the telephone inactive, electrically.

Further, most locks for telephones have applied only to dial-type telephones and these have not been altogether satisfactory because it is possible to reach an operator without use of the dial by lifting the hand set from its cradle and manipulating the disconnect plungers rapidly for ten or more times. Further, locks for the push-button, or non-dial, phone sets have been clumsy to operate, requiring so much time to unlock that callers conclude there will be no reply to the repeated ringing.

It is therefore an important object of the present invention to provide a small device consisting of one assembly easily carried in a pocket or purse and operated by one hand which when attached to a telephone will render said telephone inoperative.

Another object of the invention is to provide a single locking device which can be applied to either a push-button, non-dial, or dial type telephone.

Another object of the present invention is to provide a lock with a standard type wafer cylinder which can be re-keyed or master-keyed; thereby enabling the user to use one key for several locks.

Another object of the present invention is to provide a key operated lock which is readily applied or removed from the telephone without having to turn the telephone set around or upside down.

Another object of the present invention is to provide an attractive lock of simple and compact design which will be readily noticed when in place yet unobtrusive.

Another object of the present invention is to provide a key operated lock which can be economically formed by die-casting and assembled with a minimum of parts.

Another object of the present invention is to provide a lock which can be fixed in the unlock position to prevent unauthorized locking of the telephone without a proper key.

Another object of the present invention is to provide a lock which will prevent unauthorized use of a telephone by securing the electrical system in an inactive position thereby eleminating out-going calls and preventing listening in on the recipient of incoming calls.

Another object of the present invention is to provide a lock which can be attached to a telephone without disturbing or modifying the telephone.

Another object of the present invention is to provide a lock which can be readily attached without the use of any tools.

In accordance with this invention, a lock is provided which comprises a body member attachable into the cradle of a telephone set when said body is positioned over a disconnect plunger located in said cradle. A hook type cam is attached to the body member and engages a section of the telephone case to hold the body in the cradle with the disconnect plunger depressed. The hook cam may be manually disengaged from the telephone section by means of a key inserted into the body member.

Construction of one form of the apparatus of this invention will be more apparent from the following description, the appended claims, and the figures of the attached drawing wherein:

Similar reference characters refer to similar parts throughout the several views of the drawing.

Figure 1:
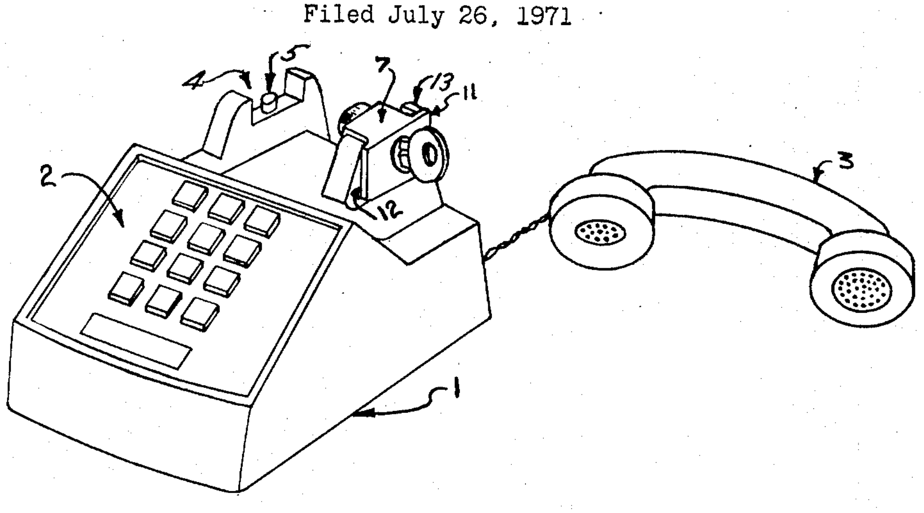
FIG. 1 is a perspective view of a telephone instrument, illustrating the manner in which the lock is positioned to hold a dissconnect plunger in a down or "off" position.

Referring now to the drawing, in FIG. 1, there is illustrated a telephone instrument 1 having a base 2 and a handset 3. When the telephone is not in use the handset is normally in a resting position on cradle 4. When in this position, the handset depresses the two disconnect plungers 5 to render the telephone instrument electrically inactive. In order to activate the telephone, it is first necessary to lift the handset from the cradle and permit the disconnect plungers 5 and 6 (FIG. 3) to rise.

Figure 2:
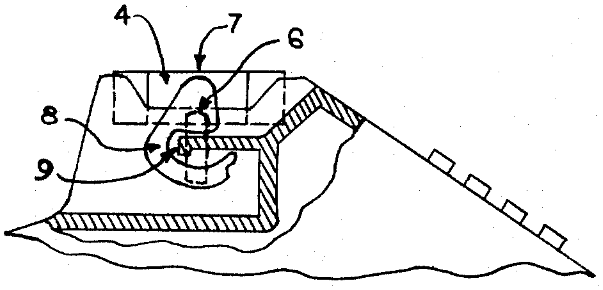
FIG. 2 is a cross-sectional elevation of a portion of a telephone base showing the lock in the locked position.

The telephone lock 7 is best shown in position to render the phone inactive as in FIG. 2. The telephone lock 7 is placed in cradle 4 to engage and depress disconnect plunger 6. Cam-hook 8 is key rotated to engage the under side of telephone base member 9 when the lock is in locked position to permit key removal.

Figure 3:
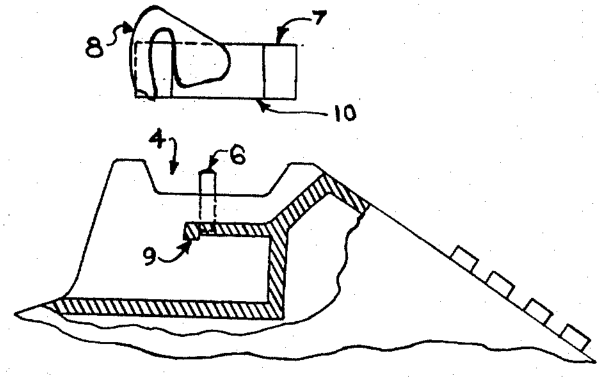
FIG. 3 is a cross-sectional view of a portion of a telephone base with the hand set removed and the disconnect plunger in the up or "on" position with the lock in an unlocked position immediately prior to attacking the lock to the telephone.

In FIG. 3 the disconnect plunger 6 is in the up or "on" position and the telephone is electrically active. Hook-cam 8 is in the "off" or unlock position relative to lock body 7. Internal construction of the lock body makes key removal possible with the hook-cam either in the locked or unlocked position.

By lowering lock body 7 into cradle 4 the body base 10 will engage and depress disconnect plunger 6. Then by key rotating hook-cam 8 until it engages telephone base member 9 the lock body 7 can be securely located to hold disconnect plunger 6 in the down or "off" position.

Figure 4:
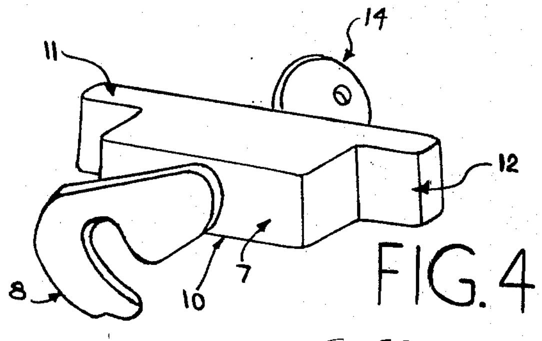
FIG. 4 is a perspective view of one version of this lock from the hook-cam side.

The lock assembly is best shown in FIG. 4. It consists of a body 7 having extensions 11 and 12 on each end for the purpose of engaging the outer surfaces of cradle members 13 (FIG. 1). Hook-cam 8 is attached to a lock cylinder which passes through body 7 and terminates where it can be engaged by a removable key 14. The key 14 can be removed while camhook 8 is in the unlock position (FIG. 4) to prevent use of the lock. The key can also be removed after cam-hook 8 has been rotated to engage telephone base member 9 (FIG. 2) leaving the lock in a locked position with disconnect plunger 6 in a depressed condition and the telephone electrically inactive.

From the above description it will be seen that the objectives of this invention have been met. It is usable on a dial-type, non-dial type and push-button type of telephone and can be attached or detached with ease without the use of additional tools. The use of standard lock cylinder construction within the body of this lock permits re-keying or master-keying so that one key will serve as many locks as a user will require.

Since certain changes may be made in the construction of above described without departing from the scope of the invention, it is intended that all matter contained in the above description and shown in the accompanying drawing shall be interpreted as illustrative and not in a limiting sense.

Having thus described my invention, I claim as new and desire to protect by Letters Patent:

1. A combination of, a telephone having a cradle for the reception of a handset consisting of a combination mouthpiece and receiver, said cradle including a pair of spaced apart bat elevated portions which are interconnected by a bat member having a cavity below it to serve as a finger-grip for carrying said telephone, a switch button movably mounted in each of the flat elevated portions, each of said switch buttons being held down to render the telephone inoperative when weighted by the handset resting in said cradle, said switch buttons being spring-loaded to rise and cause the telephone to be activated electrically when the handset is removed from the cradle, and, a lock comprising a body, removably mounted on one of the elevated portions between projections which rise perpendicular to and at each end of said elevated portions, a hook-cam integrally connected to a lock cylinder passing through said body and rotatable to lockingly engage the under side of the flat member; thereby securing the body in position on the elevated portion where the body will exert continuing pressure on a switch button causing the telephone to remain electrically inactive so long as the lock is in position, said lock body having extensions along the outer surface (that surface into which the key is inserted) which abut against the outside of the perpendicular projections to prevent said lock body from being moved parallel to the axis of the lock cylinder while said hook cam is lockingly engaged.

References Cited

UNITED STATES PATENTS

| | | | |
|---|---|---|---|
| 3,624,317 | 11/1971 | Buckingham et al. | 179—189 R |
| 3,598,931 | 8/1971 | Foote | 179—189 R |
| 2,864,906 | 12/1958 | Medenbach | 179—189 R |

THOMAS W. BROWN, Primary Examiner